Patented June 2, 1942

2,285,077

UNITED STATES PATENT OFFICE 2,285,077

VULCANIZATION ACCELERATOR

David J. Beaver, Nitro, W. Va., assignor to Monsanto Chemical Company, St. Louis, Mo., a corporation of Delaware No Drawing. Application July 23, 1937,
Serial No. 155,267

18 Claims. (Cl. 260—786)

The present invention relates to a new class of rubber vulcanization accelerators and to rubber vulcanized in the presence thereof. More particularly it relates to the use of the reaction products of mercapto aryl thiazoles and a product obtained by reacting a cyclic, tertiary nitrogen base with an ether containing a halogenated alkyl group.

For example the following products, reacted with a mercapto aryl thiazole and preferably a metallic salt thereof, for example an alkali metal salt, come within the scope of this invention: The product obtained by reacting pyridine with $\beta\beta'$ dichlorethyl ether; the product obtained by reacting pyridine with $\beta\beta'$ dichlorisopropyl ether; the product obtained by reacting pyridine with phenyl $\beta$ chlor ethyl ether; the product obtained by reacting pyridine with alpha naphthyl $\beta$ brom ethyl ether; the product obtained by reacting picoline with $\beta\beta'$ dichlorethyl ether; the product obtained by reacting picoline with phenyl $\beta$ iodo ethyl ether; the product obtained by reacting collidine with $\beta\beta'$ dichlorethyl ether; the product obtained by reacting collidine with phenyl $\beta$ chlor ethyl ether; the product obtained by reacting quinoline with $\beta\beta'$ dichlorethyl ether; the product obtained by reacting quinoline with $\beta\beta'$ dichlorisopropyl ether; the product obtained by reacting quinoline with phenyl $\beta$ chlorethyl ether; the product obtained by reacting quinoline with alpha naphthyl $\beta$ chlorethyl ether; the product obtained by reacting quinaldine with phenyl $\beta$ chlorethyl ether; the product obtained by reacting hexamethylenetetramine with $\beta\beta'$ dichlorethyl ether; and the product obtained by reacting hexamethylenetetramine with phenyl $\beta$ chlorethyl ether.

Examples of mercapto-aryl-thiazoles in the form of their metallic salts which, on reacting with the above mentioned products, form the preferred class of materials of this invention are the sodium salt of mercaptobenzothiazole; the potassium salt of mercaptotolylthiazole; the sodium salt of mercaptonaphthothiazole, the alkali metal salts of substituted mercaptobenzothiazoles as for example chlormercaptobenzothiazole, aminomercaptobenzothiazole and the like.

The following examples are specific embodiments of the invention and not limitations thereof.

EXAMPLE I 7.9 parts by weight (substantially 0.1 mol) of pyridine and 7 parts by weight (substantially 0.05 mol) of $\beta\beta'$ dichlorethyl ether were heated to 100–105° for twenty hours during which time the mixture gradually darkened and became very viscous. The product so obtained was dissolved in 200 parts by weight of alcohol and the resulting solution added to a solution consisting of 18.9 parts by weight (substantially 0.1 mol) of the sodium salt of mercaptobenzothiazole dissolved in 200 parts by weight of alcohol and 5 parts by weight of water. The resulting mixture was heated on a steam bath for three hours, filtered and the filtrate evaporated. The residue was dissolved in 500 parts by weight of chloroform and extracted with 300 parts by weight of 5% sodium carbonate solution to remove unreacted mercaptobenzothiazole, and washed with water until neutral. The desired reaction product was obtained after evaporation of the solvent. Where convenient or desirable other solvents than those specifically mentioned may be employed.

In like manner 14 parts by weight (substantially 0.1 mol) of hexamethylenetetramine was substituted for pyridine in the above procedure to give an additional example of the preferred class of materials.

To illustrate the desirable properties of the preferred class of materials in rubber, the reaction product of the sodium salt of mercaptobenzothiazole and the product obtained by reacting $\beta\beta'$ dichlorethyl ether with pyridine was incorporated in a typical rubber stock comprising

| | |
|---|---:|
| Pale crepe rubber | 100.0 |
| Zinc oxide | 8.0 |
| Sulfur | 2.5 |
| Stearic acid | 0.5 |
| Reaction product of the sodium salt of mercaptobenzothiazole and the product obtained by reacting $\beta\beta'$ dichlorethyl ether with pyridine | 1.0 |

The rubber stock thus compounded was vulcanized in a press at the temperature of 20 pounds steam pressure per square inch and the following modulus and tensile properties obtained on testing the cured rubber product.

*Table I*

| Cure time in minutes | Modulus of elasticity, in lbs./in.² at elongations of— | | Tensile at break, in lbs./in.² | Ultimate elongation, percent |
|---|---|---|---|---|
| | 500% | 700% | | |
| 30 | 776 | 3,120 | 4,110 | 765 |
| 45 | 975 | 3,580 | 4,425 | 750 |
| 60 | 1,115 | 4,080 | 4,410 | 715 |
| 90 | 1,175 | 4,240 | 4,370 | 710 |

From the data set forth in Table I it is apparent that the preferred class of materials comprise a group of valuable accelerators.

EXAMPLE II 7.9 parts by weight (substantially 0.1 mol) of pyridine and 15.6 parts by weight (substantially 0.1 mol) of phenyl $\beta$ chlorethyl ether were heated for about 22 hours at a temperature preferably of 100–105° C. The reaction product from the pyridine and the phenyl β chlor ethyl ether was dissolved in a convenient quantity of an inorganic solvent, for example alcohol, and the resulting solution added to a solution consisting of 18.9 parts by weight (substantially 0.1 mol) of the sodium salt of mercaptobenzothiazole dissolved in a convenient quantity of an organic solvent for example 200 parts by weight of alcohol and 5 parts by weight of water, and the desired reaction effected by heating on a steam bath for 4 hours, after which any insoluble material was filtered off and the filtrate evaporated therefrom. The residue was dissolved in a convenient solvent, for example 300 parts by weight of chloroform, although where convenient or desirable other solvents than those specifically mentioned may be employed, and washed with 300 parts by weight of a 5% solution of sodium carbonate to remove any unreacted mercaptobenzothiazole, and then with water until neutral. The product obtained after evaporation of the solvent was incorporated in a typical rubber stock comprising

| | |
|---|---|
| Pale crepe rubber | 100.0 |
| Zinc oxide | 8.0 |
| Sulfur | 2.5 |
| Stearic acid | 0.5 |
| Reaction product of the sodium salt of mercaptobenzothiazole with the product obtained by reacting phenyl β chlorethyl ether with pyridine | 1.0 |

The rubber stock thus compounded was vulcanized in a press at the temperature of 20 pounds steam pressure per square inch and the following modulus and tensile properties obtained on testing the cured rubber product.

*Table II*

| Cure time, in minutes | Modulus of elasticity, in lbs./in.² at elongations of— | | Tensile at break, in lbs./in.² | Ultimate elongation percent |
|---|---|---|---|---|
| | 500% | 700% | | |
| 30 | 530 | 2,200 | 3,355 | 775 |
| 45 | 704 | 2,855 | 3,995 | 760 |
| 60 | 878 | 3,425 | 3,980 | 735 |
| 90 | 1,025 | 3,840 | 4,525 | 735 |

From the data set forth in Table II it is shown that the preferred class of materials comprise a valuable group of rapid curing accelerators.

In a similar manner hexamethylenetetramine has been reacted with phenyl β chlor ethyl ether and the product so obtained reacted with the sodium salt of mercaptobenzothiazole.

Obviously the practice of this invention is not limited to the specific compositions given above, such compositions being merely illustrative of the method of employing the accelerators of this invention. The present invention is limited solely by the appended claims.

What is claimed is:

1. The process of vulcanizing rubber which comprises heating rubber and sulfur in the presence of a product obtained by initially combining a saturated alkyl ether wherein the saturated alkyl group contains a halogen substituent, the other substituent on the ether oxygen being a hydrocarbon group with a hereterocyclic base wherein the heterocyclic ring consists of carbon and tertiary nitrogen atoms, said base being free of other than hydrocarbon substituents and condensing therewith an aryl thiazole containing an S—X group in the 2-position, X being selected from a group consisting of hydrogen and alkali metal in an amount equivalent to the halogen content of the ether-base combination.

2. The process of vulcanizing rubber which comprises heating rubber and sulfur in the presence of a product obtained by initially combining a saturated dialkyl ether containing a halogen substituent with a heterocyclic base wherein the heterocyclic ring consists of carbon and tertiary nitrogen atoms said base being free of other than hydrocarbon substituents and condensing therewith an aryl thiazole containing an S—X group in the 2-position, X being selected from a group consisting of hydrogen and alkali metal in an amount equivalent to the halogen content of the ether-base combination.

3. The process of vulcanizing rubber which comprises heating rubber and sulfur in the presence of a product obtained by initially combining an alkyl aryl ether containing a halogen substituent in a saturated alkyl group with a heterocyclic base wherein the heterocyclic ring consists of carbon and tertiary nitrogen atoms said base being free of other than hydrocarbon substituents and condensing therewith an aryl thiazole containing an S—X group in the 2-position, X being selected from a group consisting of hydrogen and alkali metal in an amount equivalent to the halogen content of the ether-base combination.

4. The vulcanized rubber product produced by incorporating into rubber sulfur and a vulcanization accelerator comprising a product obtained by initially combining a saturated alkyl ether wherein the saturated alkyl group contains a halogen substituent, the other substituent on the ether oxygen being a hydrocarbon group with a heterocyclic base wherein the heterocyclic ring consists of carbon and tertiary nitrogen atoms said base being free of other than hydrocarbon substituents and condensing therewith an aryl thiazole containing an S—X group in the 2-position, X being selected from a group consisting of hydrogen and alkali metal in an amount equivalent to the halogen content of the ether-base combination and heating the mixture.

5. The vulcanized rubber product produced by incorporating into rubber sulfur and a vulcanization accelerator comprising a product obtained by initially combining a saturated dialkyl ether containing a halogen substituent with a heterocyclic base wherein the heterocyclic ring consists of carbon and tertiary nitrogen atoms said base being free of other than hydrocarbon substituents and condensing therewith an aryl thiazole containing an S—X group in the 2-position, X being selected from a group consisting of hydrogen and alkali metal in an amount equivalent to the halogen content of the ether-base combination and heating the mixture.

6. The vulcanized rubber product produced by incorporating into rubber sulfur and a vulcanization accelerator comprising a product obtained by initially combining an alkyl aryl ether containing a halogen substituent in a saturated alkyl group with a heterocyclic base wherein the heterocyclic ring consists of carbon and tertiary nitrogen atoms said base being free of other than hydrocarbon substituents and condensing therewith an aryl thiazole containing an S—X group in the 2-position, X being selected from a group consisting of hydrogen and alkali metal in an amount equivalent to the halogen content of the ether-base combination and heating the mixture.

7. The process of vulcanizing rubber which comprises heating rubber and sulfur in the presence of a product obtained by initially combining a saturated dialkyl ether containing a halogen substituent with a pyridine base and condensing therewith an aryl thiazole containing an S—X group in the 2-position, X being selected from a group consisting of hydrogen and alkali metal in an amount equivalent to the halogen content of the ether-base combination.

8. The process of vulcanizing rubber which comprises heating rubber and sulfur in the presence of a product obtained by initially combining an alkyl aryl ether containing a halogen substituent in a saturated alkyl group with a pyridine base and condensing therewith an aryl thiazole containing an S—X group in the 2-position, X being selected from a group consisting of hydrogen and alkali metal in an amount equivalent to the halogen content of the ether-base combination.

9. The process of vulcanizing rubber which comprises heating rubber and sulfur in the presence of a product obtained by initially combining a saturated dialkyl ether containing a halogen substituent with hexamethylenetetramine and condensing therewith an aryl thiazole containing an S—X group in the 2-position, X being selected from a group consisting of hydrogen and alkali metal in an amount equivalent to the halogen content of the ether-base combination.

10. The process of vulcanizing rubber which comprises heating rubber and sulfur in the presence of a product obtained by initially combining BB′ dichlor ethyl ether with pyridine and condensing therewith an alkali metal salt of mercaptobenzothiazole in an amount equivalent to the halogen content of the ether-base combination.

11. The process of vulcanizing rubber which comprises heating rubber and sulfur in the presence of a product obtained by initially combining phenyl B chlor ethyl ether with pyridine and condensing therewith an alkali metal salt of mercaptobenzothiazole in an amount equivalent to the halogen content of the ether-base combination.

12. The process of vulcanizing rubber which comprises heating rubber and sulfur in the presence of a product obtained by initially combining BB′ dichlor ethyl ether with hexamethylenetetramine and condensing therewith an alkali metal salt of mercaptobenzothiazole in an amount equivalent to the halogen content of the ether-base combination.

13. The vulcanized rubber product produced by incorporating into rubber sulfur and a vulcanization accelerator comprising a product obtained by initially combining a saturated dialkyl ether containing a halogen substituent with a pyridine base and condensing therewith an aryl thiazole containing an S—X group in the 2-position, X being selected from a group consisting of hydrogen and alkali metal in an amount equivalent to the halogen content of the ether-base combination and heating the mixture.

14. The vulcanized rubber product produced by incorporating into rubber sulfur and a vulcanization accelerator comprising a product obtained by initially combining an alkyl aryl ether containing a halogen substituent in a saturated alkyl group with a pyridine base and condensing therewith an aryl thiazole containing an S—X group in the 2-position, X being selected from a group consisting of hydrogen and alkali metal in an amount equivalent to the halogen content of the ether-base combination and heating the mixture.

15. The vulcanized rubber product produced by incorporating into rubber sulfur and a vulcanization accelerator comprising a product obtained by initially combining a saturated dialkyl ether containing a halogen substituent with hexamethylenetetramine and condensing therewith an aryl thiazole containing an S—X group in the 2-position, X being selected from a group consisting of hydrogen and alkali metal in an amount equivalent to the halogen content of the ether-base combination and heating the mixture.

16. The vulcanized rubber product produced by incorporating into rubber sulfur and a vulcanization accelerator comprising a product obtained by initially combining BB′ dichlor ethyl ether with pyridine and condensing therewith an alkali metal salt of mercaptobenzothiazole in an amount equivalent to the halogen content of the ether-base combination and heating the mixture.

17. The vulcanized rubber product produced by incorporating into rubber sulfur and a vulcanization accelerator comprising a product obtained by initially combining phenyl B chlor ethyl ether with pyridine and condensing therewith an alkali metal salt of mercaptobenzothiazole in an amount equivalent to the halogen content of the ether-base combination and heating the mixture.

18. The vulcanized rubber product produced by incorporating into rubber sulfur and a vulcanization accelerator comprising a product obtained by initially combining BB′ dichlor ethyl ether with hexamethylenetetramine and condensing therewith an alkali metal salt of mercaptobenzothiazole in an amount equivalent to the halogen content of the ether-base combination and heating the mixture.

DAVID J. BEAVER.